(12) United States Patent
Seff

(10) Patent No.: US 6,813,142 B1
(45) Date of Patent: Nov. 2, 2004

(54) LOCKING MEMBER FOR ELECTRICAL LOAD CENTER INTERIORS WITH DIFFERENT CURRENT RATING AND INTERIOR INCORPORATING SAME

(75) Inventor: Paul D. Seff, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/631,546

(22) Filed: Jul. 31, 2003

(51) Int. Cl.[7] .......................................... H02B 1/2018
(52) U.S. Cl. ....................... 361/637; 361/639; 361/648; 439/574
(58) Field of Search ................................. 361/611, 624, 361/637–640, 642, 644, 648–650, 822–823; 174/65 R, 149 B

(56) References Cited

U.S. PATENT DOCUMENTS

| | | | | |
|---|---|---|---|---|
| 3,164,752 A | * | 1/1965 | Koenig | 361/648 |
| 3,588,620 A | * | 6/1971 | Waslleski | 361/652 |
| 4,646,200 A | * | 2/1987 | M'Sadoques et al. | 361/638 |
| 5,181,165 A | | 1/1993 | Gehrs et al. | |
| 5,337,211 A | | 8/1994 | Reiner et al. | |
| 5,340,945 A | | 8/1994 | Gehrs et al. | |
| 5,450,282 A | | 9/1995 | Webber et al. | |
| 5,519,175 A | * | 5/1996 | Cole | 174/149 B |
| 6,191,948 B1 | * | 2/2001 | Beyer | 361/729 |
| 6,301,094 B1 | * | 10/2001 | Soares et al. | 361/608 |
| 6,359,770 B1 | * | 3/2002 | Kolody et al. | 361/626 |
| 6,400,559 B1 | * | 6/2002 | Kohler et al. | 361/648 |

* cited by examiner

Primary Examiner—Boris Chervinsky
(74) Attorney, Agent, or Firm—Martin J. Moran

(57) ABSTRACT

A single locking member secures bus bars of different current ratings in the elongated support of a load center interior. The locking member has a lip on an outer end forming an inwardly facing locking surface that engages an outer edge of either size bus bar. A first outwardly facing locking surface formed by a first transverse groove in the locking member engages an inwardly facing abutment surface on a flange on the elongated support to secure the narrower bus bar in a lateral slot in the elongated support. The flange on the elongated support seats in a second groove in the locking member, spaced farther from the lip to secure a wider bus bar in the slot in the elongated support. The invention also embraces a load center interior incorporating the locking member.

18 Claims, 5 Drawing Sheets

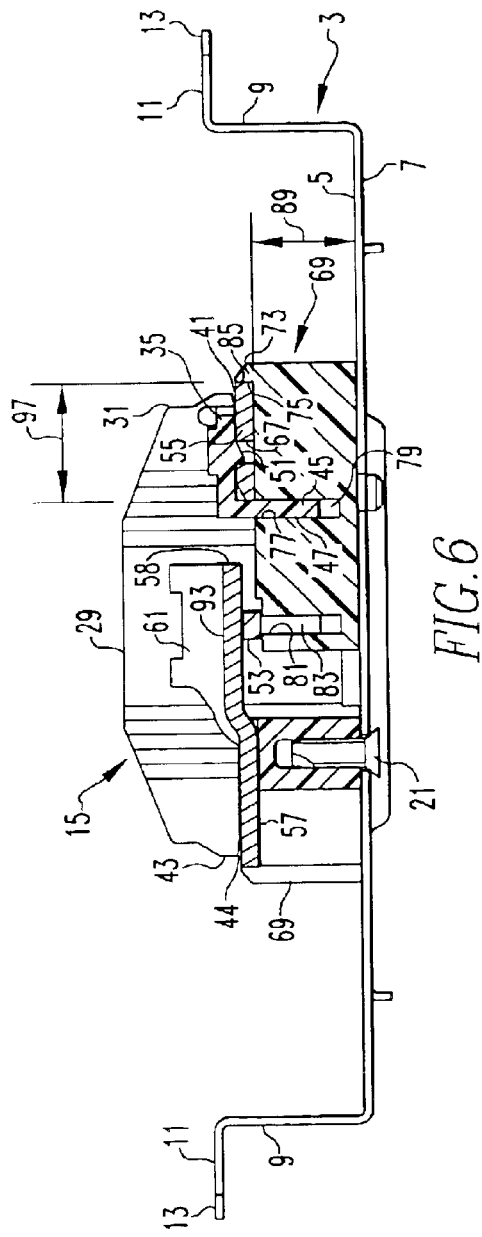
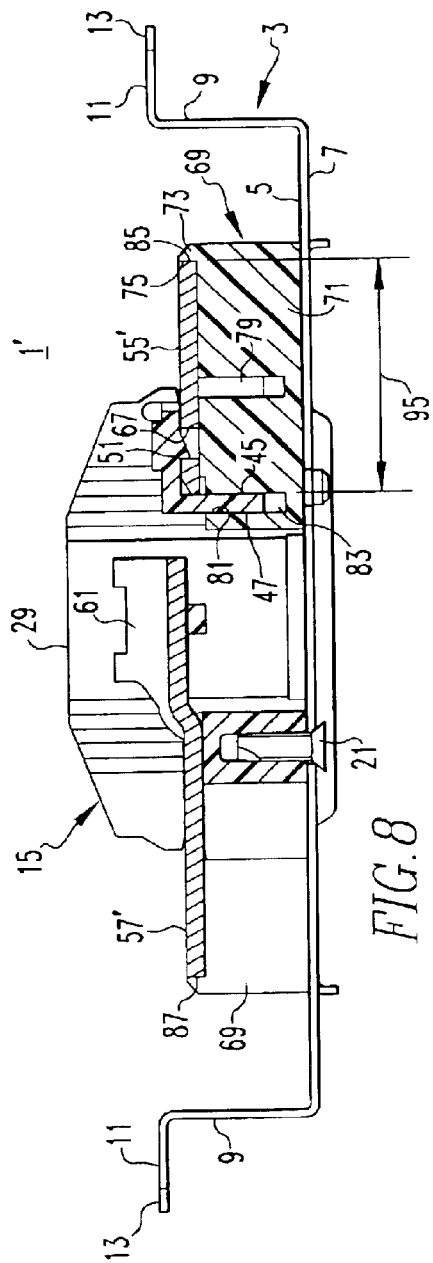

LOCKING MEMBER FOR ELECTRICAL LOAD CENTER INTERIORS WITH DIFFERENT CURRENT RATING AND INTERIOR INCORPORATING SAME

BACKGROUND OF THE INVENTION

1. Field of the Invention

This invention relates to the interiors of load centers for electric power distribution systems and includes a locking member for securing bus bars to the interior that can be used interchangeably with interiors with different current ratings, and therefore, different size bus bars.

2. Background Information

Load centers are used to distribute electric power to a number of branch circuits in a distribution system and to provide overload/overcurrent protection for those branch circuits. These functions are performed by what is known in the industry as an interior mounted inside an electrical enclosure. The interior includes a back pan secured to the rear wall of the enclosure. Mounted to the back pan is an electrically insulative support member supporting a pair of bus bars, each connected to an incoming line. The bus bars are mounted vertically side by side with stabs projecting from confronting edges interleafed in vertical alignment. The back pan has flanges along each side with vertically spaced notches that are engaged by the housings on miniature circuit breakers. The circuit breakers have a terminal that engages a stab to complete the mechanical connection of the circuit breaker to the interior and to electrically connect the protected branch circuit to a bus bar through the circuit breaker. The load center also includes terminals connecting the neutral conductors of the branch circuits to an incoming neutral line.

Typically, the support member of the interior is molded of an electrically insulative resin. In one arrangement, the bus bars seat in lateral slots formed in the vertical sides of the support member and are retained in place by sawtooth cleats molded on the support member to extend into the slots and engage openings in the bus bars. It is common for the bus bars to be connected to the incoming wiring by screw terminals. In the described arrangement, torque applied to the terminal screw to connect or disconnect the bus bar to or from the incoming wiring can cause the bus bar to disengage from the cleats and rotate out of the slot in the support member.

There is a need, therefore, for an improved load center with an arrangement that precludes the bus bars from rotating relative to the support member of the interior as the terminal screws are tightened or loosened.

SUMMARY OF THE INVENTION

This need and others are satisfied by the invention, which is directed to a locking member that firmly secures the bus bars in the support member of the interior of a load center, and to a load center interior incorporating such a locking member.

The load center of the invention comprises, in general, a back pan and an electrically insulative elongated support extending along the front face of the back pan. The elongated support has a lateral slot extending along at least one side, and at least one inwardly facing abutment surface positioned laterally inward of this at least one side. An elongated bus bar is seated in the lateral slot in the elongated support and has an outwardly facing edge and a plurality of spaced apart stabs extending forward from adjacent an inner edge. At least one locking member has a first locking surface facing laterally outward and engaging the inwardly facing abutment surface on the elongated support, and a second locking surface facing laterally inward spaced outward of the first locking surface and engaging the outwardly facing edge of the at least one bus bar to retain the bus bar in the lateral slot in the elongated support. The outwardly facing locking surface on the locking member can be defined by a groove in a locking member body. Also, the inwardly facing locking surface on the locking member that engages the outwardly facing edge on the bus bar can be formed by a forward extending flange on the locking member body.

In accordance with another aspect of the invention the elongated support comprises a longitudinally extending wall section forming the abutment surface engaged by the locking member.

In one embodiment of the invention, the elongated support has another lateral slot extending along another side edge in which is seated another bus bar. Another locking member secures this additional bus bar in the support member in a similar fashion.

In accordance with another aspect of the invention, a single locking member is structured for use with either of one load center interior and another load center interior, the one load center interior having one back pan, and one elongated support mounted on the back pan and having one lateral slot extending along one side and one laterally inwardly facing abutment surface. This one load center further includes one elongated bus bar seated in the one lateral slot and having one outer side edge and one width. The another load center interior comprises another back pan and another elongated support mounted on the another back pan and having another lateral slot extending along another side and another laterally inwardly facing abutment surface. Another elongated bus bar is seated in the another lateral slot and has another side edge and another width that is greater than the one width of the one bus bar. The locking member comprises a body having an inwardly facing outer locking surface engageable with the side edge of either one of the one and another elongated bus bars. The body of the locking member further has a first outwardly facing locking surface engageable with the one inwardly facing abutment surface on the one elongated support and a second outwardly facing locking surface engageable with the another inwardly facing abutment surface on the another elongated support, the first outwardly facing locking surface being between the inwardly facing outer locking surface and the second outwardly facing locking surface. The first and second outwardly facing locking surfaces on the locking member can be formed by grooves in a locking body while a flange on the body forms the inwardly facing outer locking surface. Through openings can be provided in the body of the locking member to reduce mass.

BRIEF DESCRIPTION OF THE DRAWINGS

A full understanding of the invention can be gained from the following description of the preferred embodiments when read in conjunction with the accompanying drawings in which:

FIG. 6 is a cross sectional view taken along the line 6-6 in FIG. 1.

FIG. 8 is a cross sectional view taken along the line 8-8 in FIG. 7.

DESCRIPTION OF THE PREFERRED EMBODIMENTS

Figure 1:
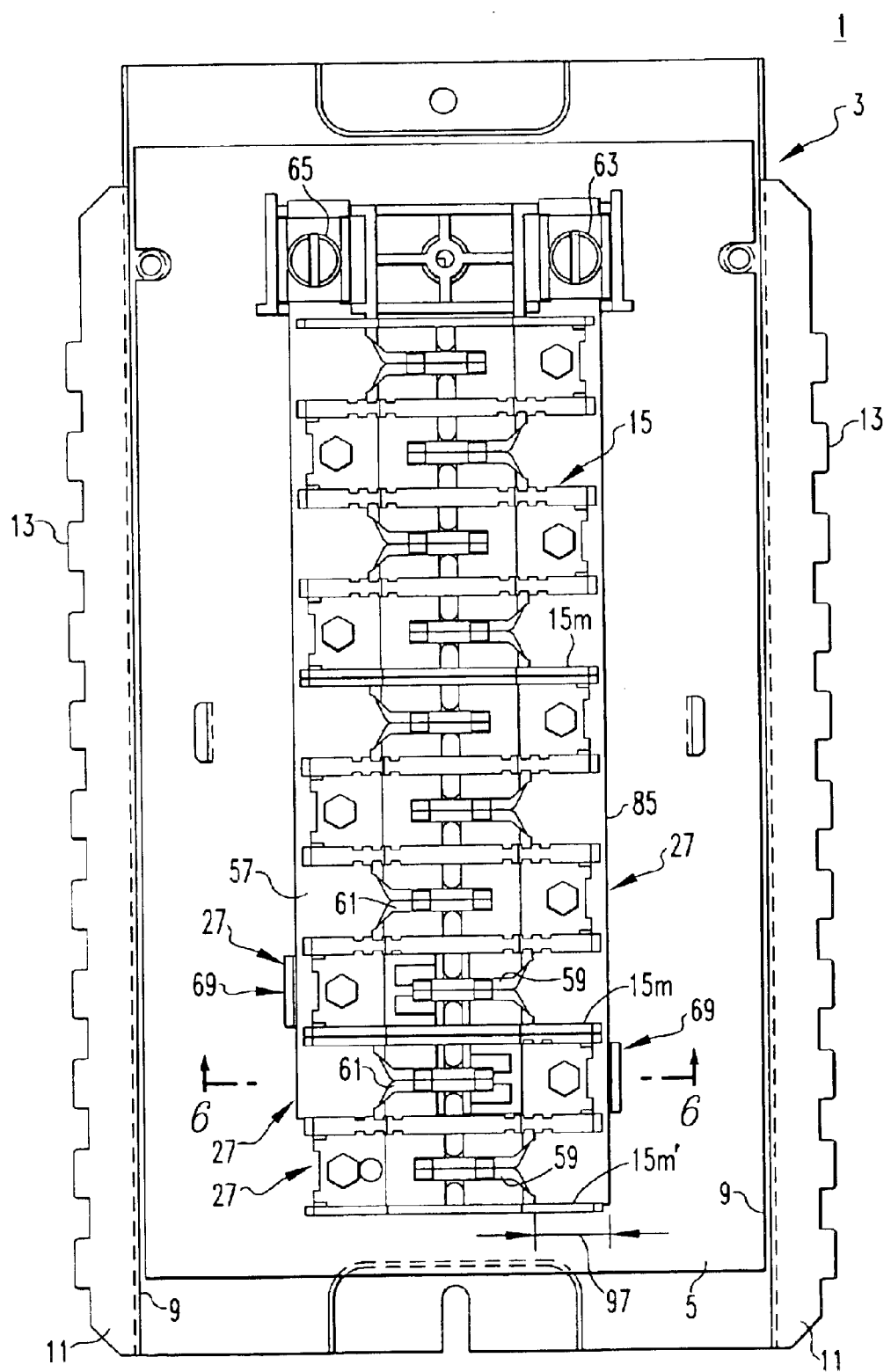
FIG. 1 is a front view of a 125 amp load center interior incorporating the invention.

FIGS. 1 and 6 illustrate a load center interior 1 for a 125 amp service. This interior 1 includes a back pan 3 having a front face 5 and a rear face 7. A pair of flanges 9 extend forward along the side edges of the back pan 3 and terminate in laterally outwardly extending terminal sections 11. The terminal sections 11 are crenulated to form spaced apart outward projections 13.

Figure 3:
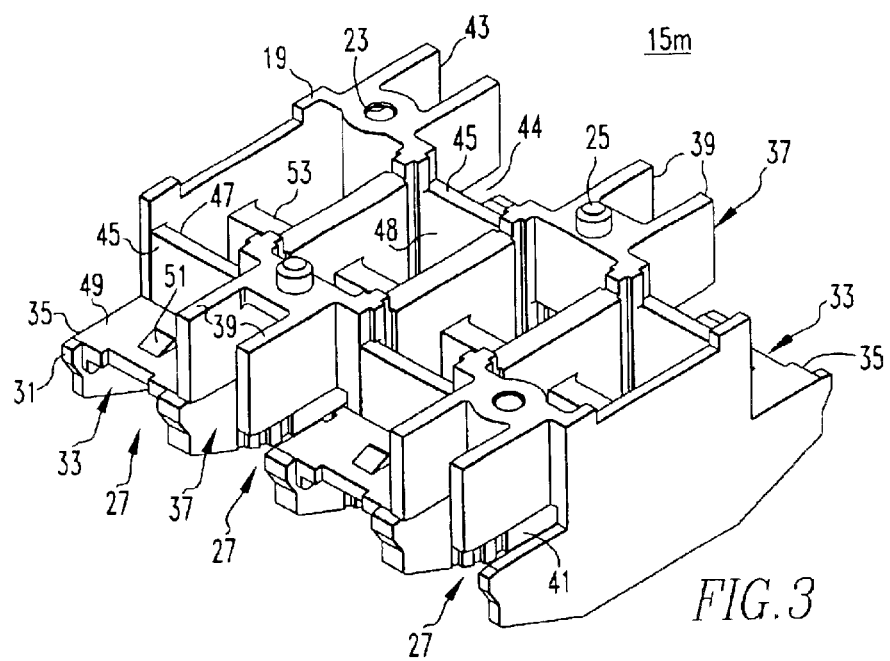
FIG. 3 is an isometric view from below of the support member module.
Figure 4:
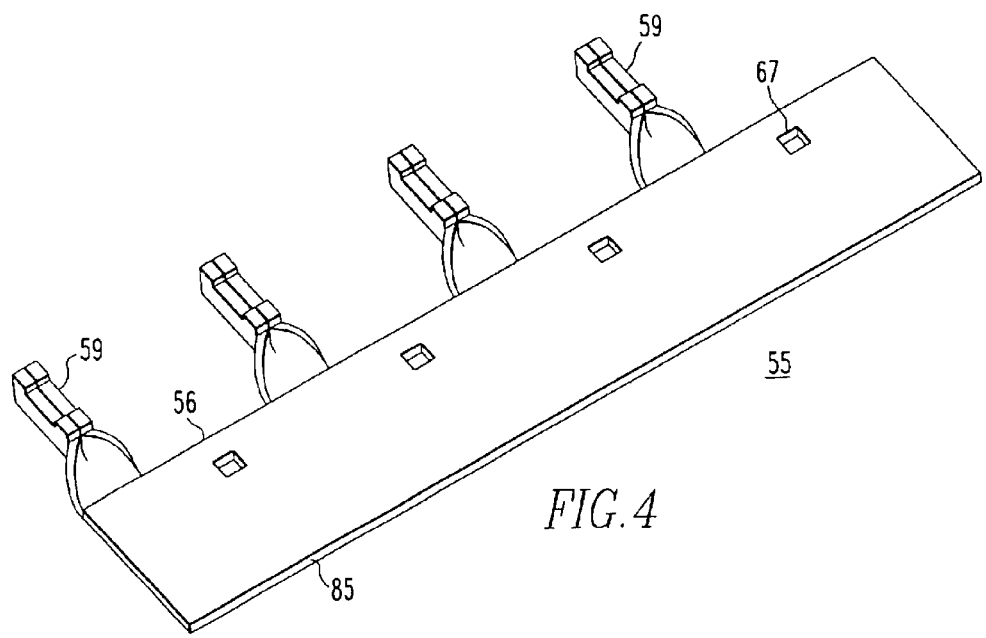
FIG. 4 is an isometric view of a bus bar which forms part of the interior of FIG. 1.

Interior 1 also includes an elongated support 15 that is assembled from a number of modules 15m. As shown in FIGS. 3 and 4, the basic support member modules 15m are four-pole modules. The interior 1 shown in FIG. 1 is made up of two of these four-pole modules 15m and one two-pole module 15m' which is similar to the four-pole module but half the size. The modular construction of the support member 15 facilitates the assembly of interiors for load centers servicing varied numbers of branch circuits.

Figure 2:
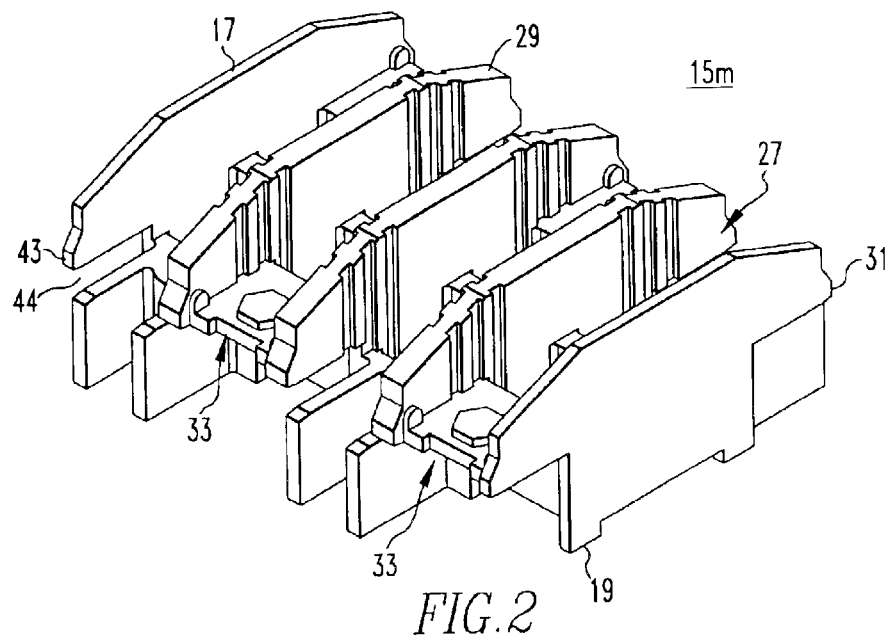
FIG. 2 is an isometric view from above the module of a support member which forms part of the interior of FIG. 1.

The elongated support 15 whether constructed of modules 15m or 15m', or formed as a single piece, are molded from an electrically insulative resin, as is well known. The support member modules 15m have a front 17 and rear 19 as shown in FIGS. 2 and 3. They are mounted on the back pan 3 with the rear 19 facing the front face 5 of the back pan. The support member modules 15m are secured in place by fasteners such as screws 21 extending through the back pan an into openings 23 in the back of the modules 15 as can be seen in FIG. 6. For sake of clarity, the direction rearward will be toward the back pan 3, and forward will be away from the back pan. Laterally will mean parallel to the front face of the back pan 1. As used herein, the direction inward means laterally toward the center of the elongated support and outward means laterally away from the center. The elongated support modules 15m are further fixed to the back pan by molded pins 25 on the rear of the modules which seat in openings (not shown) in the back pan.

The poles 27 are formed by laterally and forwarding extending barriers 29 that provide electrical isolation between adjacent poles. Along one side 31 of the elongated support module 15m one pole 27 has a forward portion 33 formed by a flange 35 extending in a lateral plane parallel to the front face of the back pan 3. The adjacent pole 27 has a rearward section 37 formed by a pair of flanges 39 extending outward in parallel planes perpendicular to the front face 5 of the back pan 3. These forward portions 33 and rearward portions 37 alternate in adjacent poles and are offset front to rear to form a laterally extending slot 41. Along the second side 43 of the modules 15m the forward portions 33 and rearward portions 37 also alternate to form a second laterally extending slot 44, but a pole 27 having a forward portion 33 on one side will have a rearward portion 37 on the other side and vice versa. The forward portions 33 have a rearwardly extending wall section 45 forming an inwardly facing abutment surface 47. Molded onto the rear face 49 of the flanges 35 are saw tooth cleats 51 for a purpose to be described. A center spine 53 extends longitudinally between the barriers 29.

The interior 1 also includes a pair of bus bars 55 and 57 that are generally flat, but have spaced apart folded extensions that extend forward from an inner edge 56, 58 to form stabs 59 and 61, respectively. The bus bar 55 seats in the laterally extending slot 41 along the first side 31 of the support member 15 while the second bus bar 57 seats in the corresponding slot 44 in the second side 43 of the support member 15. The bus bars 55 and 57 are positioned such that the stabs 59 and 61 are interleafed in vertical alignment in alternate poles 27. Screw terminals 63 and 65 mechanically and electrically connect the bus bars 55 and 57, respectively, at their upper ends to incoming line conductors (not shown), as is well known. The bus bars 55 and 57 are provided with square through openings 67 in which the saw tooth cleats 51 seat, as best shown in FIG. 6 to retain the bus bars in the elongated support 15. As previously discussed, torque applied to the screw terminals 63 and 65 can dislodge the bus bars 55 and 57 from the saw tooth cleats 51 resulting in the bus bar at least partially rotating out of the corresponding slot 41, 44. For right-handed screw terminals, this would occur for the bus bar 57 upon tightening of the terminal 65. On the other hand, the bus bar 55 would be dislodged should an attempt be made to open a tightly screwed terminal 63.

Figure 5:
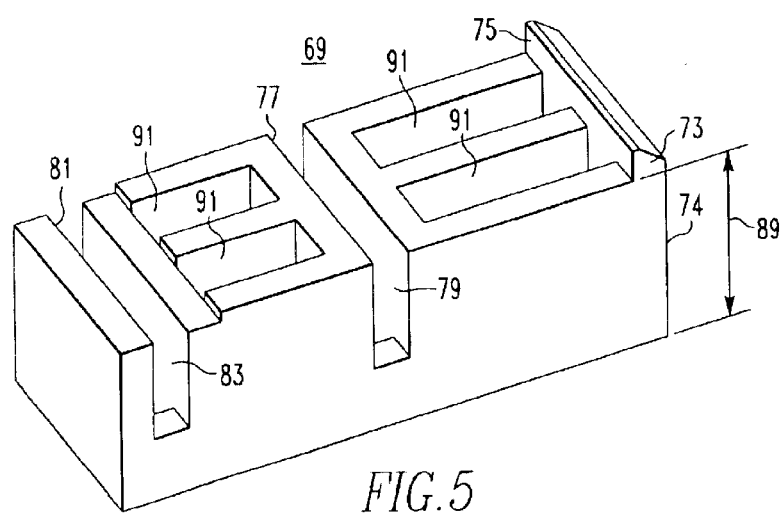
FIG. 5 is an isometric view of a locking member in accordance with the invention.

In accordance with the invention, a locking member 69 prevents such rotation of the bus bars 55 and 57. As can best be seen in FIGS. 5 and 6, the locking member 69 has a molded body 71 with a forwardly extending flange or lip 73 at an outer end 74 forming an inwardly facing locking surface 75. A first outwardly facing locking surface 77 is formed by an opening such as the groove 79 extending crosswise through the body 71. A second outwardly facing locking surface 81 is similarly formed by a second opening such as the groove 83. The first groove 79 is sized to receive the wall section 45 of the elongated support 15 of the 125 amp interior 1 as shown in FIG. 6. Thus, before the support member 15 is secured to the back pan 3 the bus bars 55 and 57 are seated in the grooves 41 on the sides 31 and 43, respectively of the elongated support 15. The locking member 69 is then seated with the first groove 79 engaging the wall section 45. The spacing between the groove 79 and the flange 73 is such that the inward locking surface 75 engages the outwardly facing edge 85 of the bus bar 55. Another locking member 69 similarly engages the outwardly facing edge 87 of the second bus bar 57 and receives the side wall 45 on the opposite side of the support member 15. The forward to rearward dimension 89 of the body 71 of the locking member 69 is such that when the assembly of the elongated support 15, bus bars 55 and 57, and the locking member 69 is secured to the back pan 3, the locking member 69 is captured and extends between the associated bus bar and the back pan. The body 71 of the locking member 69 is cored out by a number of through passages 91 to reduce the volume of resin needed to form the locking member. The top surface of the body 71 is grooved at 93 to accommodate the central spine 53 of the elongated support 15 and gives extra strength to the assembly.

Figure 7:
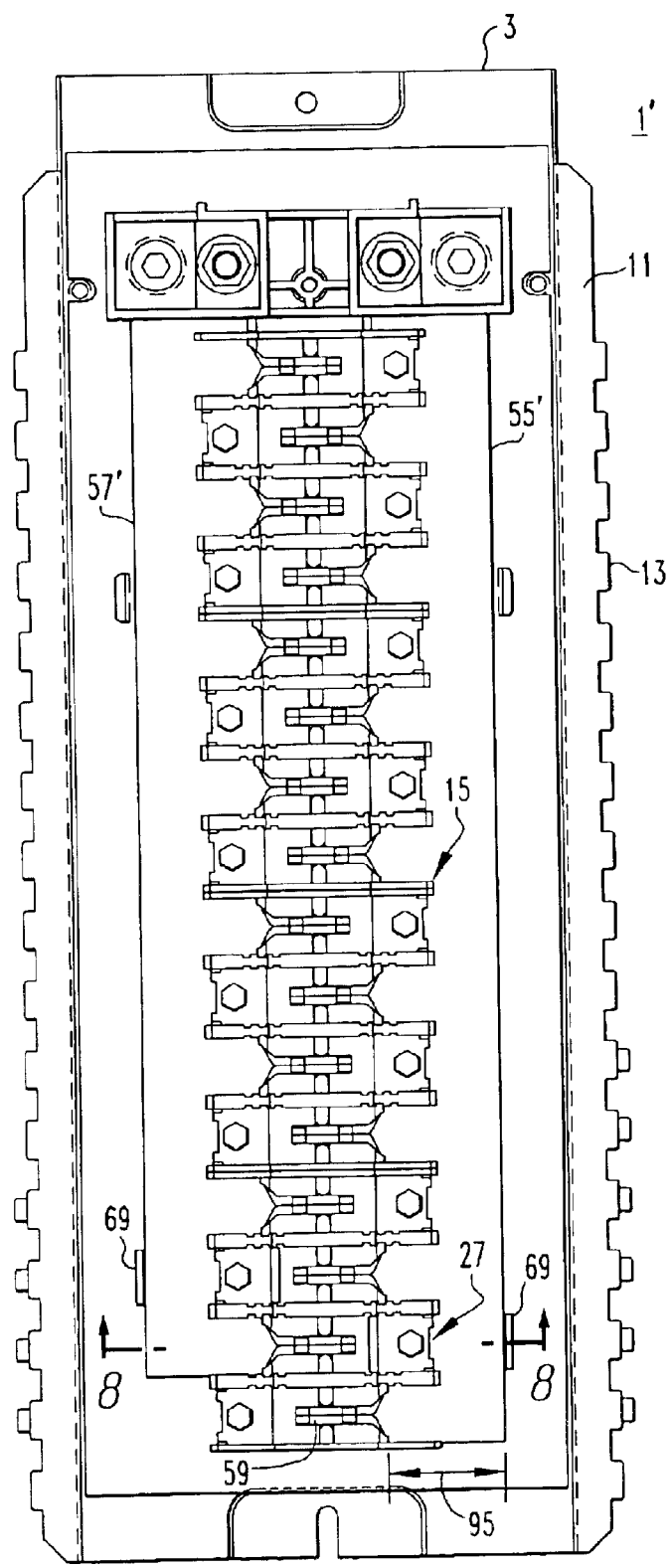
FIG. 7 is a front view of a 200 amp center interior incorporating the invention.

The locking member 69 can be used with interiors with different current ratings. Thus, as can be seen by referring to FIGS. 7 and 8 where the bus bars 55' and 57' have a width 95 which is greater than the width 97 of the bus bars 55 and 57 to provide 200 amp service interior 1', it can be seen that the wall section 45 on the elongated support 15 seats in the second groove 83 in the locking member with the flange 73 still seating against the outwardly facing edge of the wider bus bar. Thus, the locking member can be interchangeably used in interiors with two different current ratings. Of course, additional grooves could be provided to accommodate bus bars of additional widths. It should be noted, that in both cases all of the components except the bus bars are the same.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical load center interior comprising:
   a back pan having a front face and a rear face;
   an electrically insulative elongated support extending along the front face of the back pan and having a lateral slot extending along at least one side and at least one inwardly facing abutment surface positioned laterally inward of the at least one side;
   an elongated bus bar seated in the lateral slot in the elongated support having an outwardly facing edge and a plurality of spaced apart stabs extending forward from adjacent an inner edge; and
   at least one locking member having a first outwardly facing locking surface engaging the inwardly facing abutment surface on the elongated support and an inwardly facing locking surface spaced outward of the first outwardly facing locking surface engaging the outwardly facing edge of the at least one bus bar to retain the at least one bus bar in the lateral slot in the elongated support.

2. The interior of claim 1, wherein the lateral slot extending along the at least one side of the elongated support comprises a first lateral slot extending along a first side of the elongated support and a second lateral slot extending along a second side of the elongated support, the at least one inwardly facing abutment surface comprises a first inwardly facing abutment surface positioned inward of and facing inward relative to the first side of the elongated support and a second inwardly facing abutment surface positioned inward of and facing inward relative to a second side of the elongated support, the elongated bus bar comprises a first elongated bus bar seated in the first lateral slot having the outwardly facing edge and a first set of spaced apart stabs extending forward from adjacent an inner edge, and a second elongated bus bar seated in the second lateral slot having an outwardly facing edge and a second set of spaced apart stabs extending forward from adjacent and inner edge of the second elongated bus bar and interleaved with the first set of stabs, and wherein the at least one locking member comprises a first locking member having a first outwardly facing locking surface engaging the first inwardly facing abutment surface on the elongated support and an inwardly facing locking surface spaced outward of the first inwardly facing locking surface engaging the outwardly facing edge of the first elongated bus bar to retain the first bus bar in the first lateral slot in the elongated support, and a second locking member having a first outwardly facing locking surface engaging the second inwardly facing abutment surface on the elongated support and an inwardly facing locking surface spaced outward from the third locking surface engaging the outwardly facing edge of the second elongated bus bar to retain the second elongated bus bar in the second lateral slot.

3. The interior of claim 1, wherein the locking member comprises a body with a groove forming the first outwardly facing locking surface.

4. The interior of claim 3, wherein the inwardly facing locking surface is formed by a forward extending flange on the body.

5. The interior of claim 1, wherein the elongated bus bar has a screw terminal extending rearward toward the bus bar.

6. The interior of claim 5, wherein the inwardly facing locking surface is formed by a forward extending flange.

7. The interior of claim 1, wherein the elongated support comprises at least one longitudinally extending wall section forming the at least one inwardly facing abutment surface.

8. The interior of claim 7, wherein the at least one locking member comprises a body having a groove forming the first outwardly facing locking surface and in which the wall section of the elongated support seats to retain the bus bar and locking member in place.

9. The interior of claim 8, wherein the at least one locking member extends from the bus bar rearward to the back pan.

10. The interior of claim 9, wherein the body has at least one through opening to reduce volume of the body.

11. The interior of claim 7, wherein the elongated support has alternating forward and rearward laterally extending portions defining the lateral slot and the at least one longitudinal wall section defines the at least one inwardly facing abutment surface that extends rearward from a forward laterally extending portion of the elongated support toward but not to the back pan so that the locking member extends between the wall section and the back pan.

12. The interior of claim 11, wherein the locking member is dimensioned to engage both the at least one bus bar and the back pan to provide rearward support for the bus bar and to capture the locking member with the wall section.

13. A locking member for use in either of:
   one load center interior, comprising:
   one back pan;
   one elongated support mounted on the one back pan and having one lateral slot extending along one side and one inwardly facing abutment surface;
   one elongated bus bar seated in the one lateral slot and having one outer side edge and one width; and
   another load center interior comprising:
   another back pan;
   another elongated support mounted on the another back pan and having another lateral slot extending along another side and another inwardly facing abutment surface; and
   another elongated bus bar seated in the another lateral slot and having another outer side edge and another width that is greater than the one width of the one bus bar; and
   the locking member comprising:
   a body having an inwardly facing outer locking surface engagable with the outer side edge of either one of the one and the another elongated bus bar, a first outwardly facing locking surface engageable with the one inwardly facing abutment surface on the one elongated support and a second outwardly facing locking surface engageable with the another inwardly facing abutment surface on the another elongated support, the first outwardly facing locking surface being between the inwardly facing outer locking surface and the second outwardly facing locking surface.

14. The locking member of claim 13 comprising a body with a flange forming the inwardly facing outer locking surface.

15. The locking member of claim 13 comprising a body with one recess defining the first outwardly facing locking surface and another recess defining the second outwardly facing locking surface.

16. The locking member of claim 15, wherein the body has a flange forming the inwardly facing outer locking surface.

17. The locking member of claim 16, wherein the body has at least one through opening to reduce mass.

18. The locking member of claim 15, wherein the one recess and another recess are grooves extending rearward and across the body.

* * * * *